United States Patent [19]

Friedrichs

[11] Patent Number: 4,784,185

[45] Date of Patent: Nov. 15, 1988

[54] PIPE FOR GASES AND LIQUID WITH SCREW FLANGE

[75] Inventor: Karl G. Friedrichs, Leverkusen, Fed. Rep. of Germany

[73] Assignee: Flifa-Fahrzeugteile GmbH & Co., Mannheim, Fed. Rep. of Germany

[21] Appl. No.: 32,231

[22] Filed: Mar. 31, 1987

[30] Foreign Application Priority Data

Apr. 3, 1986 [DE] Fed. Rep. of Germany ....... 3611177

[51] Int. Cl.⁴ .............. F16L 9/12; F16L 11/02
[52] U.S. Cl. .................... 138/109; 138/178; 285/149
[58] Field of Search .............. 138/103, 109, 110, 177, 138/178, 123-127, 172, 174; 285/149; 428/36

[56] References Cited

U.S. PATENT DOCUMENTS

| | | | |
|---|---|---|---|
| 1,562,954 | 11/1925 | Goodall | 138/109 X |
| 3,650,550 | 3/1972 | West | 138/109 X |
| 3,723,234 | 3/1973 | MacDonald | 138/109 |
| 3,899,006 | 8/1975 | Champleboux et al. | 138/109 |
| 3,920,049 | 11/1975 | Lippert et al. | 138/109 |
| 4,493,864 | 1/1985 | Thomson | 138/109 |
| 4,523,738 | 6/1985 | Raftis et al. | 138/109 X |

Primary Examiner—James E. Bryant, III
Attorney, Agent, or Firm—Sixbey, Friedman, Leedom & Ferguson

[57] ABSTRACT

A pipe for gases and liquids made of heat-resistant plastic comprises a cylindrical body with a perimetric attachment flange having bores for attachment screws and is reinforced by an integrally molded reinforcement ring which is disposed concentrically around an end of the pipe and which is provided with side extensions that concentrically surround the bores of the flange and that have a height that is the same as the thickness of the flange in proximity to the bores. The side extensions may be shaped to provide integral washers at the bottom (attaching face) of the flange.

7 Claims, 2 Drawing Sheets

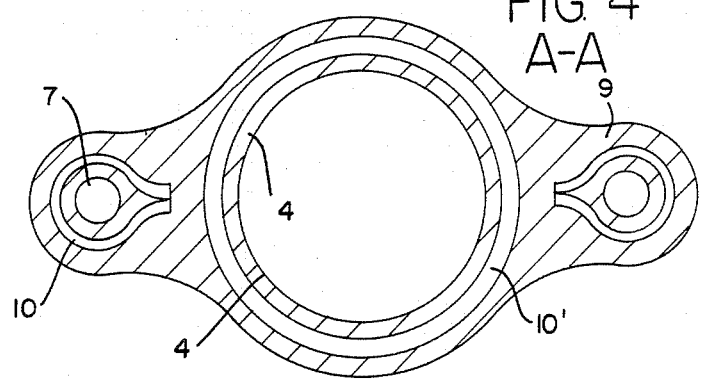
FIG. 4 A-A
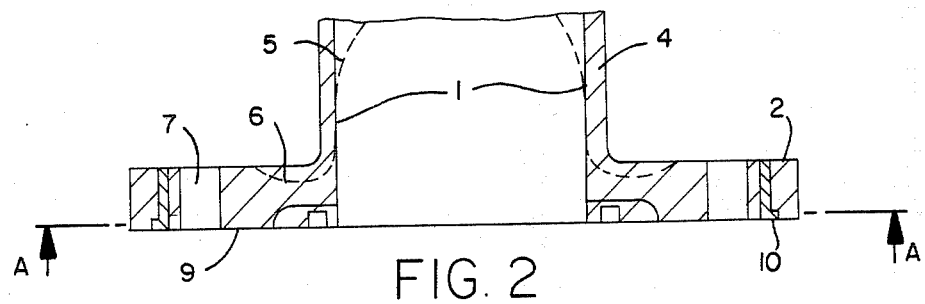
FIG. 1
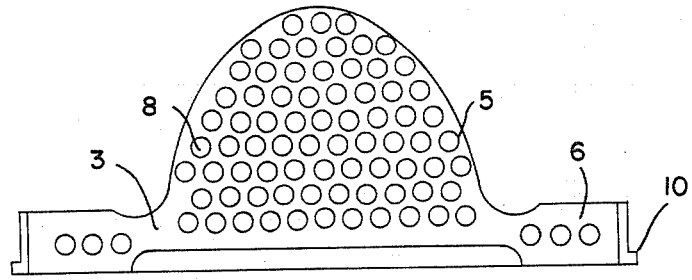
FIG. 2
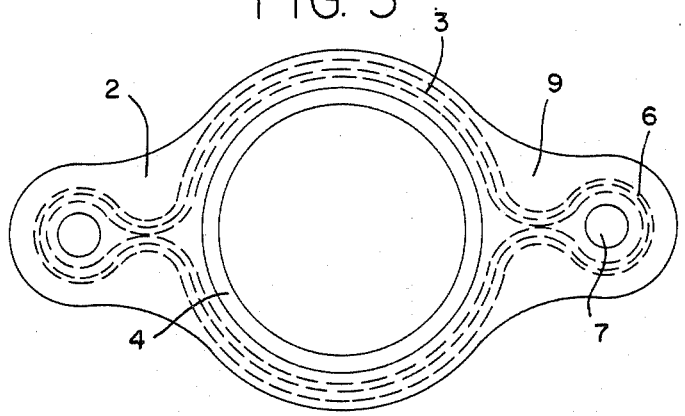
FIG. 3

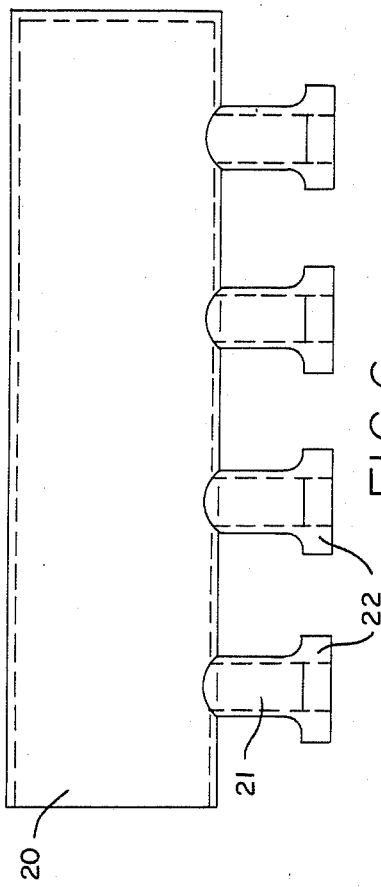
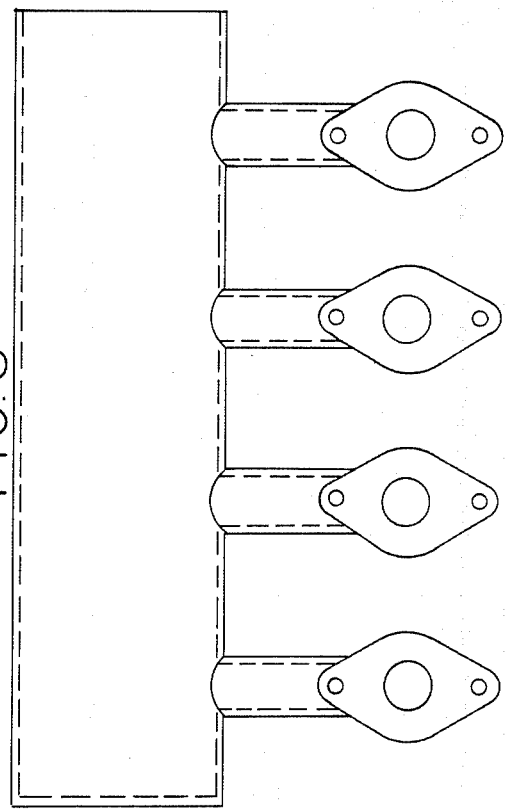
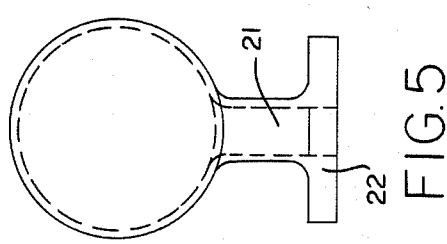
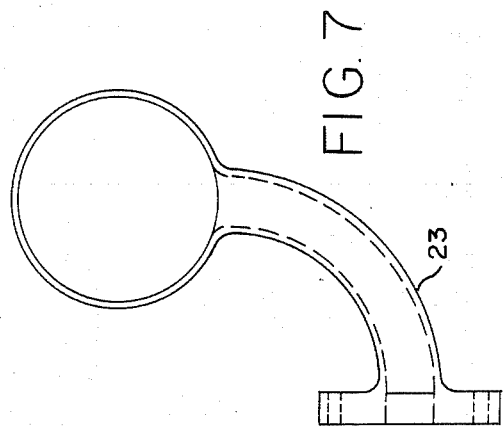
FIG.6
FIG.8
FIG.5
FIG.7

PIPE FOR GASES AND LIQUID WITH SCREW FLANGE

The invention relates to a pipe for gases and liquids with screw flange.

In motor vehicle engines pipes with screw flanges are known which are used in particular as induction pipes. These pipes with screw flanges consist normally of aluminium. For production-technical reasons exact keeping to dimensions is difficult and complicated finishing is necessary, such as milling, drilling, cleaning and flushing.

In the gases and liquids which are conveyed through such pipes flow losses occur due to the rough inner surfaces of the pipes.

The invention is based on the poblem of providing pipes which can be made economically whilst eliminating the disadvantages of the prior art, reduce the flow resistance to gases and liquids, have very accurate dimensions, can be made continuously by a simple method and have a low weight.

The problem underlying the invention is solved by the pipe for gases and liquids with screw flange according to claim 1. Further advantageous developments of the invention are set forth in the following claims 2 to 4.

The invention will be explained in detail with the aid of the following FIGS. 1 to 8.

FIG. 1 is a side elevation in section of an embodiment of the pipe with screw flange according to the invention in schematic representation;

FIG. 2 is a schematic side elevation of the flange profiled metal sheet according to the invention;

FIG. 3 is a view of the lower side of the screw flange of the device according to the invention;

FIG. 4 is a view corresponding to FIG. 3 of another embodiment of the pipe with screw flange according to the invention;

FIGS. 5, 6, 7, 8 are preferred embodiments for the induction tubes according to the inventio in side and front elevation.

The device 1 according to the invention consists of a pipe 4 having an integrally formed attachment flange. Pipe 4 is made from injection-moldable heat-resistant plastic, in particular from suitable polyamide with 50% glassfibre reinforcement.

In the region of the flange 2 of the pipe 4 a profiled or shaped metal sheet 3 is embedded by injection molding such that it forms, in the region of the sealing face 9, a metal termination.

In the flange region 2, vertical bores 7 are formed which are provided for screws used to attach the pipe by the screw flange, for example, to the cylinder head of the engine.

The profiled metal sheet 3 is an irregularly formed tubular part having two ear-shaped extensions 6 and two upwardly extending cylinder-segment extensions 5.

The ear-shaped side extendions 6 are formed substantially concentrically round the bores 7 and the extensions 5 substantially concentrically round the tube end 4. They extend coaxially to the screw-on axis through the flange, i.e. terminate aligned with the (plastic) surface. Under pressure stress the metal sheet thus takes up the entire pressure forces and the plastic is relieved of load.

The profiled metal sheet 3 has a number of perforations 8 serving for the anchoring in the plastic.

In accordance with FIG. 3, in the plan view of the lower side 9 of the flange 2, the partially concentric arrangement of the profiled metal sheet 3 can be seen firstly round the bores 7 and secondly round the actual tube. The reference numerals have the significance already indicated.

FIG. 4 shows another embodiment according to the invention. This embodiment proceeds from a profiled metal sheet 3 whose lower edge after being moulded into the screw flange 2 projects from the support face thereof, said projecting region then being bent outwardly onto the bottom (attaching face) of the flange 2. In this manner a profiled metal sheet 3 with integral washer 10 is formed. In corresponding manner additionally the region 5 of the sheet 3 disposed concentrically round the tube end 4 can project from the bottom 9 and be bent over to form the integral washer 10'.

The pipe with flange according to the invention is preferably made as follows: it can be made by the core puller method or by the melt-out method. In the first method for example conduits are made in the form of FIGS. 5 and 6. The tool (not shown) consists of two mold halves and cores which fill the cavities 20, 21 with a wall distance of for example 4 mm (in the flange region the distance is larger).

In the region of the flanges 22 suitable receiving portions are provided for the profiled metal sheet both in the mold halves and in the cores. As a result the perforated metal sheet is held exactly in the desired position. After the filling of the mold with injectable plastic the metal sheet is surrounded all round with material except for the desired free faces. The cores can be pulled and the mold halves opened to remove the pipe.

In the second method for curved pipes a lost core, which again is spaced from the walls of two mold halves, is made from low-melting material (about 150° C.) (FIGS. 7 and 8). In the region of the flange (23) receiving means (not shown) are provided which position the profiled metal sheet. The core can then be inserted into one mold half and the tool can close. After the filling of the cavities with injectable material the mold halves are removed and the core and pipe dipped into a bath having a temperature >150° C. The core of low-melting material becomes liquid and runs out of the mold. The pipe with the embedded metal sheet remains behind.

I claim:

1. A pipe for gases and liquids made of heat-resistant plastic comprising a cylindrical body with a perimetric attachment flange having bores for attachment screws and being reinforced by a reinforcement ring that is integrally molded into the attachment flange and disposed concentrically around an end of the pipe, wherein the reinforcement ring is made from a perforated profiled metal sheet having side extensions which concentrically surround the bores of the flange, said extensions having a height that is the same as the thickness of the flange in proximity to the bores.

2. A pipe according to claim 1, wherein the metal sheet is formed with axially extending cylinder segment extensions disposed concentrically around the tube end.

3. A pipe according to claim 2, wherein the cylinder segment extensions extend parallel to the pipe body.

4. A pipe according to claim 3, wherein the metal sheet has a portion which projects from the botom of the flange, the projecting portion being formed into an integral washer by being outwardly bent onto the bototm of the flange.

5. A pipe according to claim 2, wherein the metal sheet has a portion which projects from the bottom of the flange, the projecting portion being formed into an integral washer by being outwardly bent onto the bottom of the flange.

6. A pipe according to claim 1, wherein the metal sheet has a portion which projects from the bottom of the flange, the projecting portion being formed into an integral washer by being outwardly bent onto the bottom of the flange.

7. A pipe according to claim 1, wherein said side extensions are essentially tubular in shape having a longitudinal axis extending parallel to the bores of the flange.

* * * * *

UNITED STATES PATENT AND TRADEMARK OFFICE
CERTIFICATE OF CORRECTION

PATENT NO. : 4,784,185
DATED : Nov. 15, 1988
INVENTOR(S) : Karl G. Friedrichs

It is certified that error appears in the above-identified patent and that said Letters Patent are hereby corrected as shown below:

On the face of the patent, item [73] in the Assignee name, change "Flifa-Fahrzeugteile" to
--KLIFA-Fahrzeugteile--

Signed and Sealed this

Twenty-eighth Day of March, 1989

Attest:

DONALD J. QUIGG

Attesting Officer

Commissioner of Patents and Trademarks